United States Patent
de Mollerat du Jeu et al.

(10) Patent No.: US 7,964,122 B2
(45) Date of Patent: Jun. 21, 2011

(54) METHOD OF SHAPING AN ASPHERICAL OPTICAL ELEMENT

(75) Inventors: Christian de Mollerat du Jeu, Les Milles (FR); Jean-François Carre, Pertuis (FR); Marc Ferrari, Marseilles (FR); Gérard Lemaitre, Aix en Provence (FR); Emmanuel Hugot, Simiane Collongue (FR)

(73) Assignees: Societe Europeenne de Systemes Optiques, Aix en Provence (FR); Centre National de la Recherche Scientifique, Paris (FR)

( * ) Notice: Subject to any disclaimer, the term of this patent is extended or adjusted under 35 U.S.C. 154(b) by 18 days.

(21) Appl. No.: 12/486,393

(22) Filed: Jun. 17, 2009

(65) Prior Publication Data

US 2009/0315202 A1    Dec. 24, 2009

(30) Foreign Application Priority Data

Jun. 20, 2008  (FR) .................................... 08 03467

(51) Int. Cl.
*B29D 11/00* (2006.01)
(52) U.S. Cl. .......................................... 264/2.7; 264/162
(58) Field of Classification Search .................. None
See application file for complete search history.

(56) References Cited

U.S. PATENT DOCUMENTS

| | | | | |
|---|---|---|---|---|
| 4,606,151 A * | 8/1986 | Heynacher | ...................... | 451/42 |
| 4,802,309 A * | 2/1989 | Heynacher | ...................... | 451/41 |
| 4,856,234 A * | 8/1989 | Goins | ............................. | 451/42 |
| 4,895,585 A * | 1/1990 | Angenent et al. | ................. | 65/39 |
| 4,902,102 A * | 2/1990 | Breidenthal | .................. | 359/896 |
| 6,648,741 B2 * | 11/2003 | Schneider | ..................... | 451/390 |
| 7,229,178 B1 | 6/2007 | Headley et al. | | |

FOREIGN PATENT DOCUMENTS

FR  2 626 208 A  7/1989
GB  2 163 073 A  2/1986

OTHER PUBLICATIONS

International Search Report from French Application No. 08/03467, filed Jun. 20, 2008.
Stephen F. Sporer: "TMT: stressed mirror polishgin fixture study"; PROC. SPIE, vol. 6267; Jun. 26, 2006; XP008102616.

* cited by examiner

*Primary Examiner* — Monica A Huson
(74) *Attorney, Agent, or Firm* — Alston & Bird LLP

(57) ABSTRACT

A method of shaping an aspherical optical element, such as a composite mirror element, the method comprising the following steps:

fastening, preferably by adhesive, an optical element blank, presenting an optical surface that is to be shaped, to the inside of a ring, the optical surface of the blank projecting beyond an edge of said ring;

applying forces and moments to the perimeter of the ring in such a manner as to deform it in controlled manner, thereby also deforming the optical surface of the blank fastened to its inside;

shaping said deformed optical surface by abrasion so as to restore it to a shape that is spherical or planar; and extracting the blank from the ring so as to release the stresses deforming said shaped optical surface, thereby enabling it to acquire the desired aspherical shape.

20 Claims, 1 Drawing Sheet

METHOD OF SHAPING AN ASPHERICAL OPTICAL ELEMENT

CROSS-REFERENCE TO RELATED APPLICATIONS

This application claims priority from French Application No. 08 03467, filed Jun. 20, 2008, which is hereby incorporated herein in its entirety by reference.

BACKGROUND OF THE INVENTION

The invention relates to a method of shaping an aspherical optical element such as a lens or a mirror. The invention applies in particular to shaping segments of segment mirrors of large dimensions.

The shaping of aspherical optical elements is a process that is lengthy, difficult, and expensive, in particular when it is necessary to obtain complex aspherical surfaces of large dimensions (e.g. of diameter greater than or equal to 1 meter (m), with a shape that is defined very accurately with a very low level of roughness.

These conditions are to be found, for example, when fabricating segments for the purpose of building up very large segmented mirrors, that may reach diameters of several tens of meters and that are used as the main mirrors of the most recent astronomical telescopes known as "Extremely Large Telescopes" (ELT). These mirrors are made up of a large number (several hundreds or thousands) of segments, that are generally hexagonal in shape and that are assembled together edge to edge. The position and the orientation of each segment can be controlled by actuators with accuracy and resolution of nanometer order. Each segment is constituted by an off-axis aspherical mirror of relatively large dimensions (of the order of one meter or more).

A first technique that can be used for shaping such aspherical optical elements is numerically controlled grinding and polishing using tools of small dimensions mounted on robot arms. That method has been used in particular for fabricating the elements of the "Gran Telescopio Canarias" telescope: see the article by R. Geyl et al.: "Gran Telescopio optics manufacture: final report", Proc. SPIE, Vol. 6273, 2006. That method presents the drawback of giving rise to numerous surface defects of high spatial frequencies, defects that need to be corrected in a subsequent step of machining by ion bombardment. This results in fabrication that is lengthy and expensive.

A second technique known as stress mirror polishing (SMP) was proposed in 1980 by J. Lubliner and J. Nelson. That technique, used for the American Keck telescope and recommended for the future 30-meter telescope (TMT) makes it possible rapidly to obtain optical surfaces that are complex, and highly aspherical, while being reduced merely to simple spherical polishing. In that technique, a blank for shaping having an optical surface of plane of spherical shape is deformed mechanically so as to present an aspherical shape that is complementary to the shape desired. Thereafter, the deformed optical surface is shaped by abrasion (it is ground and polished) so as to make it spherical. Finally, the blank is allowed to relax and return to its initial rest state. The optical surface that acquired a spherical profile while the blank was in its deformed state, thus takes on the desired aspherical shape.

The SMP technique is faster than numerically controlled polishing with small tools and it enables surfaces to be obtained that are of better quality. Nevertheless, the deformation stresses applied to the blank are not completely uniform, and that gives rise to defects at the periphery of the shaped optical surface. To remedy that drawback, it is possible to use a blank of diameter greater than that of the desired optical element, so as to make it possible to cut off a peripheral ring that corresponds to the zone in which such defects are concentrated, which zone has a width of the same order as the thickness of the blank (typically several tens of millimeters). That increases the cost of the finished optical element.

In a variant, or in addition, it is possible to correct surface defects by a subsequent step of machining by ion bombardment. However that operation also leads to extra expense.

The SMP technique is described in detail in the following articles:

J. Lubliner, J. Nelson: "Stressed mirror polishing. 1: A technique for producing non-axisymmetrical mirrors", Applied Optics, Vol. 19, No. 14, pp. 2332-2340, 1980;

J. Nelson et al.: "Stressed mirror polishing. 2: Fabrication of an off-axis section of a paraboloid", Applied Optics, Vol. 19, No. 14, pp. 2341-2352, 1980; and F. S. Sporer: "TMT—Stressed mirror polishing fixture study", Proc. SPIE, Vol. 6267, 2006.

OBJECT AND SUMMARY OF THE INVENTION

The invention seeks to improve that method of shaping aspherical optical elements.

More particularly, an object of the invention is to provide a method of shaping an aspherical optical element that introduces fewer surface defects than the SMP technique known in the prior art.

Another object of the invention is to minimize the thickness of the peripheral region of the blank that needs to be cut off at the end of the shaping operation, or even to eliminate it completely.

Yet another object of the invention is to make implementing a method of the SMP type simpler and less expensive.

In accordance with the invention, at least one of the above-mentioned objects can be achieved by a method of shaping an aspherical optical element that comprises the steps consisting in:

fastening an optical element blank, presenting an optical surface that is to be shaped, to the inside of a ring, the optical surface of the blank projecting beyond an edge of said ring;

applying forces to the perimeter of the ring in such a manner as to deform it in controlled manner, thereby also deforming the optical surface of the blank fastened to its inside;

shaping said deformed optical surface by abrasion so as to restore it to a shape that is spherical or planar; and extracting the blank from the ring so as to release the stresses deforming said shaped optical surface, thereby enabling it to acquire the desired aspherical shape.

In advantageous implementations of the invention:

The blank may be fastened to the inside of said ring by adhesive all around its perimeter.

The optical surface of the blank may project 0.5 millimeters (mm) to 5 mm, and preferably 1 mm to 2 mm from said edge of the ring.

Said ring may present a maximum thickness lying in the range 1 to 5 times, and preferably in the range 2 to 3 times the thickness of the blank. Said ring may present extra thickness in a peripheral region, said extra thickness extending in a direction away from said optical surface.

Said ring may present a width l measured in a radial direction that is not less than the thickness of said blank, and that preferably lies in the range one to two times said thickness.

The blank may be made of glass or of ceramic material, while the ring is made of metal.

Radially-extending arms (extending outwards or inwards) may be fastened to the perimeter of said ring for the purpose of applying said forces and moments in order to deform the ring and the blank. In particular, these arms may be disposed uniformly all around the perimeter of said ring and the number of arms lies in the range 4 to 24, and preferably in the range 6 to 12.

Said arms may extend radially towards the outside, or advantageously towards the inside of said ring.

Said blank may present a shape that is substantially circular. Under such circumstances, the method may also include a subsequent step of cutting the shaped blank so as to give it a shape that is substantially hexagonal.

In any event, the method may also include a subsequent step of cutting the shaped blank so as to remove a peripheral region therefrom.

Said shaping step may comprise at least a grinding operation and a polishing operation.

The method may also include a subsequent step of finishing polishing by means of a polisher robot.

In particular, said optical element may be a composite mirror element.

BRIEF DESCRIPTION OF THE DRAWINGS

Other characteristics, details, and advantages of the invention appear on reading the following description made with reference to the accompanying drawings given by way of example and showing, respectively.

MORE DETAILED DESCRIPTION

Figure 1:
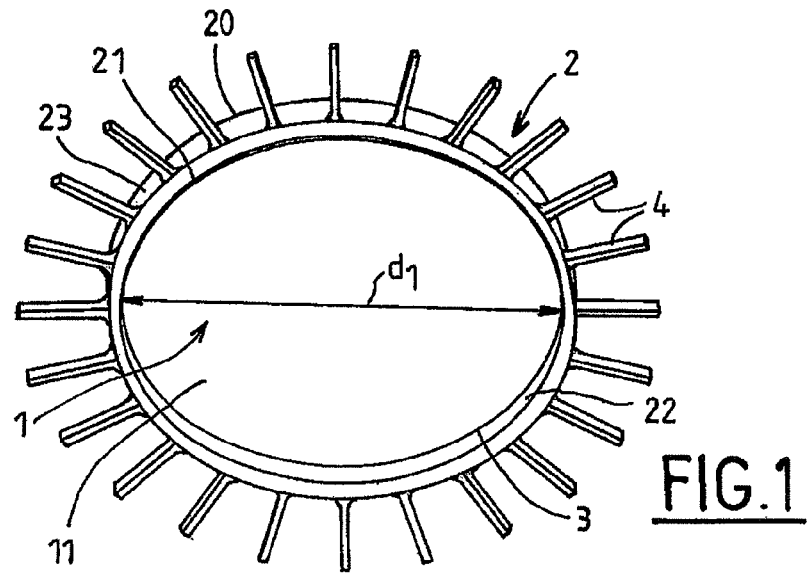
FIG. 1, an elevation view of a blank for an optical element, fastened in a ring and ready to be deformed and shaped in accordance with the method of the invention.

The method of the invention enables an aspherical optical element to be fabricated, such as a mirror or a lens, starting from a blank made of a suitable material, typically a glass or a ceramic.

A blank 1 suitable for implementing the invention presents a shape generally in the form of a plate, i.e. having one dimension that is significantly smaller than the other two (smaller by at least one order of magnitude). Typically, the blank 1 may have thickness of the order of 10 mm to 100 mm, e.g. 50 mm, and a diameter of the order of 1000 mm to 2000 mm, or even more.

The blank 1 is preferably circular in shape, for reasons that are explained below, and this applies even when the optical element to be fabricated is to have some other shape (e.g. hexagonal). Advantageously, the diameter of the blank is greater than the diameter of the finished optical element. For example, in order to fabricate a hexagonal mirror having a diameter of 1500 mm, it is possible to start with a blank having a diameter of 1600 mm.

Thus, the blank 1 is generally cylindrical in shape, with a diameter $d_1$ and height (thickness) $e_1 \ll d_1$, and it presents two main surfaces 10 and 11, together with a peripheral or side surface 12.

The main surface 10 is the "optical surface" that is to be shaped. Preferably, it begins by being spherical or planar in shape.

It is assumed here that the opposite main surface 11 (rear face) is plane.

In accordance with the conventional SMP technique of the prior art, radially-oriented arms may be fastened, e.g. by adhesive, to the side surface 12 of the blank 1 so as to enable it to be deformed by applying forces and moments. In the above-mentioned article by J. Lubliner et al., it is shown that deformation appropriate for the desired object can be obtained by applying to said arms, solely: shear forces oriented parallel to the side surface 12 of the blank and perpendicularly to its main faces 10 and 11; and bending moments about axes that are oriented tangentially relative to said side surface 12 and parallel to the main faces 10 and 11.

As explained above, the forces applied to the blank 1 via the arms are selected so as to impart an aspherical shape to the optical surface 10 that is complementary to the desired shape. The extent to which the surface is out-of-shape (difference relative to a spherical shape) can reach values of several hundreds of micrometers, and it can be monitored accurately by interferometric measurement on the optical face 10 itself or on the opposite face 11 of the blank. Typically, the deformation of the optical surface 10 gives rise to aberrations of the astigmatism, coma, and possibly spherical defocusing types.

Thereafter, a conventional method of shaping by abrasion is implemented (grinding followed by polishing) in order to make the deformed surface 10 planar or spherical. Releasing the stresses causes the blank to relax: the shaped surface 10 then takes on the desired aspherical shape.

The surface 10 may be characterized, in particular by interferometry, and if necessary a new step of polishing under stress can be implemented.

That method suffers from certain imperfections.

Firstly, the deforming forces and moments are not applied uniformly all around the blank, but are concentrated at the arms. This gives rise to non-uniformity of the stresses, and thus to deformations at the periphery of the blank. After shaping, this gives rise to "serrations", i.e. the optical surface is modulated periodically around the circumference of the blank.

Furthermore, the forces exerted by the arms on the blanks are locally very intense, and that can lead to surface defects at a high spatial frequency, and can even give rise to ruptures, thereby reducing the range of deformations that are accessible.

For these reasons, it is recommended to cut a peripheral ring off from the shaped blank, the width of the ring being at least of the same order as the thickness of said blank, or even more.

The inventors have observed that these drawbacks can be eliminated, or at least significantly attenuated, by fastening the blank for shaping inside a ring, and by applying the deformation forces and moments to said ring. In this way, the deformation stresses are transmitted to the blank, but only after being "averaged out" and made uniform within the ring. This serves both to avoid the serration effect and also defects at high spatial frequency as is used by forces being concentrated on the side surface of the blank.

FIG. 1 shows a blank 1 that is fastened by means of a layer of adhesive 3 to the inside surface 22 of a ring 2 made of metal, e.g. of invar. The material constituting the ring is selected so that the resulting assembly is stable over the duration of the shaping operations in the environment of a workshop. In particular, the temperature stability of the assembly is optimized.

Arms 4 that extend radially outwards are fastened to the outside surface 23 of the ring so as to apply deformation forces and moments. The stresses induced by applying these forces and moments, as made uniform within the ring 2, are transmitted to the blank 1 via the layer of adhesive 3.

Figure 4:
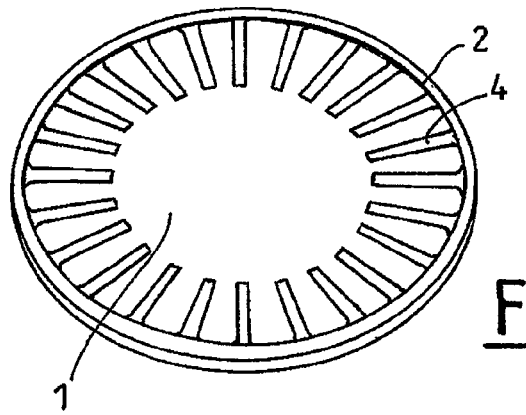
FIG. 4, an elevation view of a blank-and-ring assembly in an alternative embodiment of the invention.

As shown in FIG. 4, the arms may alternatively extend inside the ring (above or below the blank). This solution makes it possible to provide an assembly that is more compact, but more difficult to implement if the number of arms is high.

Typically, each arm carries two actuators: a first actuator being located at the junction between the arm and the ring to apply forces to the ring; and a second actuator at the distal end of the arm in order to apply moments. Depending on the deformation that is to be obtained, the application of moments need not be necessary: under such circumstances, it is not essential to provide arms, it being possible for the actuators to be fastened directly to the outside surface of the ring. Moments of small magnitude can also be applied in the absence of arms, if the actuators that are fastened directly to the ring are located above or below the midplane of the blank.

In any event, the number of arms, or in the absence of arms the number of actuators, is generally at least four and preferably at least six.

A numerical simulation has shown that a deformation of 162 micrometers (μm) on a mirror made of "Zerodur" ceramic having a diameter of 1500 mm can be obtained without the stresses in the blank exceeding 2 megapascals (MPa) by using 24 arms and an invar ring having an outside diameter of 1600 mm. In comparison, if the arms were to be fixed directly to the side surface of the blank, as in prior art methods, the stresses within the blank would reach 10 MPa, and that is not acceptable.

FIG. 1 shows the ring-and-blank assembly seen from the rear face 11 thereof. In the figure, the references 20 and 21 indicate the "top" and "bottom" edges of the ring situated respectively beside the optical face 10 and beside the rear face 11 of the blank.

Figures 2, 3:
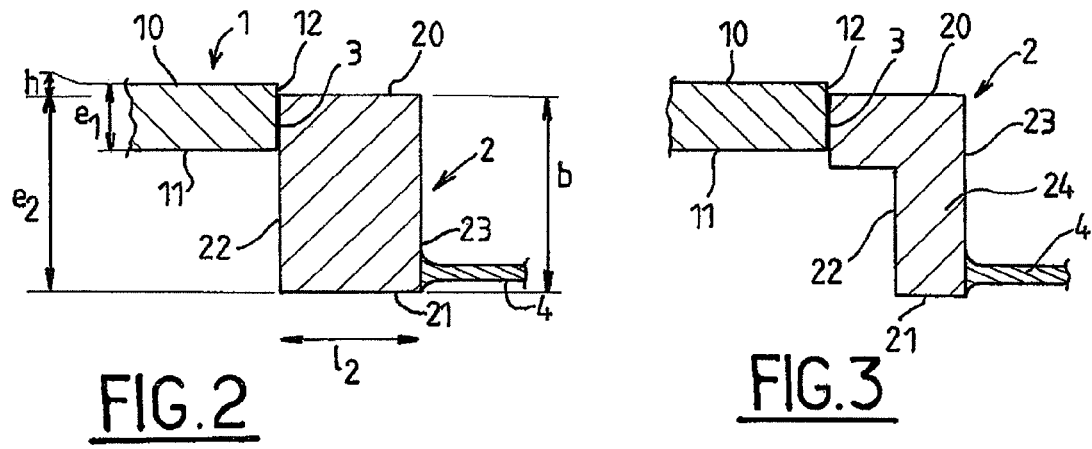
FIG. 2, a detail view in section of the assembly constituted by the blank and the ring of FIG. 1.
FIG. 3, a detail view in section of an assembly constituted by a blank and a ring in accordance with an alternative embodiment of the invention.

FIG. 2 shows the connection between the blank 1 and the ring 2 in greater detail. It can be seen that the ring 2 presents a thickness $e_2$ that is generally greater than the thickness ($e_1$) of the blank. As an indication, $e_2$ may lie in the range 1 to 5 times $e_1$, and preferably in the range 2 to 3 times $e_1$.

Nevertheless, the optical surface 10 of the blank projects by a height h above the top edge 20 of the ring. This height, typically of the order of 0.5 mm to 5 mm, and preferably lying in the range 1 mm to 2 mm, needs to be sufficient to ensure there is no contact between the element used for polishing the optical surface 10 and the ring 2.

The width $l_2$ of the ring is generally at least of the same order as the thickness of the blank (typically lying in the range 1 to 2 times said thickness, more generally in the range 0.5 to 2 times, or possibly even more). If the ring is of insufficient width, then it does not make stresses sufficiently uniform, however, if it is made too thick then it becomes more difficult to deform the ring-and-blank assembly.

The arms 4 for applying forces and bending moments are preferably fastened to the ring close to its bottom edge (i.e. its edge remote from the optical surface 10), so that the ring distributes stresses better around the outline 12 of the blank via the layer of adhesive.

The use of a ring 1 serves to reduce the number of arms needed to deform the blank, with this being by virtue of the above-mentioned effect whereby stresses are made more uniform. Thus, the invention makes it possible to use a number of arms lying in the range 4-6 to 12 in circumstances where, using prior art techniques, it would have been necessary to use 24 arms or even more. This reduction in the number of arms serves to reduce the number of parameters that need to be set: the method is thus simpler to implement, and the risk of setting errors is reduced.

Furthermore, reducing the number of arms greatly facilitates implementing the embodiment of FIG. 4 where said arms are oriented towards the inside of the ring in order to reduce the overall size of the assembly.

As explained above, under certain circumstances, the arms may even be omitted, with the blank being deformed by four or more actuators that are fastened directly to the outside surface of the ring.

The layer of adhesive 3 is preferably placed in uniform manner over the entire periphery 12 of the blank 1. This serves simultaneously to maximize the uniformity with which the blank is deformed and also to minimize the intensity of the stresses.

In any event, the blank must be capable of being separated from the ring at the end of the shaping operation. For example, the adhesive may be dissolved by using a solvent, or it may decompose under the effect of heat.

FIG. 3 shows an alternative embodiment of the invention in which the ring 2 is not of rectangular cross-section, but presents a region 24 of greater thickness in its peripheral portion. This embodiment enables the ring, which is a heavy tool, to be made lighter.

In the embodiment shown in FIG. 1, both the blank 1 and the ring 2 are circularly symmetrical. This is a preferred embodiment since a shape of this type enables better control to be obtained over the deformation and enables stress concentrations to be avoided. An optical element of some other shape (in particular a hexagonal element), can be obtained by suitably cutting the shaped circular blank.

Nevertheless, in a variant, it is possible to use blanks and/or rings of other shape (hexagonal, square, . . . ). Furthermore, there is no need for the width $l_2$ of the ring to be constant; by way of example, it is possible to envisage using a ring having one inside surface 22 with a hexagonal base and one outside surface with a circular base.

What is claimed is:

1. A method of shaping an aspherical optical element, the method comprising the following steps:
    fastening an optical element blank, presenting an optical surface that is to be shaped, to the inside of a ring, the optical surface of the blank projecting beyond an edge of said ring;
    applying forces to the perimeter of the ring in such a manner as to deform it in controlled manner, thereby also deforming the optical surface of the blank fastened to its inside;
    shaping said deformed optical surface by abrasion so as to restore it to a shape that is spherical or planar; and
    extracting the blank from the ring so as to release the stresses deforming said shaped optical surface, thereby enabling it to acquire the desired aspherical shape.

2. A method according to claim 1, wherein the blank is fastened to the inside of said ring by adhesive all around its perimeter.

3. A method according to claim 1, wherein the optical surface of the blank projects 0.5 mm to 5 mm from said edge of the ring.

4. A method according to claim 1, wherein said ring presents a maximum thickness lying in the range 1 to 5 times the thickness of the blank.

5. A method according to claim 1, wherein said ring presents extra thickness in a peripheral region, said extra thickness extending in a direction away from said optical surface.

6. A method according to claim 1, wherein said ring presents a width measured in a radial direction that is not less than the thickness of said blank.

7. A method according to claim 1, wherein the blank is made of glass or of ceramic material, while the ring is made of metal.

8. A method according to claim 1, wherein radially-extending arms extend are fastened to the perimeter of said ring for the purpose of applying said forces and moments in order to deform the ring and the blank.

9. A method according to claim 8, wherein said arms are disposed uniformly all around the perimeter of said ring and wherein the number of arms lies in the range 4 to 24.

10. A method according to claim 8, wherein said arms extend radially towards the inside of said ring.

11. A method according to claim 1, wherein said blank presents a shape that is substantially circular.

12. A method according to claim 11, also including a subsequent step of cutting the shaped blank so as to give it a shape that is substantially hexagonal.

13. A method according to claim 1, also including a subsequent step of cutting the shaped blank so as to remove a peripheral region therefrom.

14. A method according to claim 1, wherein said shaping step comprises at least a grinding operation and a polishing operation.

15. A method according to claim 1, also including a subsequent step of finishing polishing by means of a polisher robot.

16. A method according to claim 1, wherein said optical element is a composite mirror element.

17. A method according to claim 1, wherein the optical surface of the blank projects 1 to 2 mm from said edge of the ring.

18. A method according to claim 1, wherein said ring presents a maximum thickness lying in a range 2 to 3 times the thickness of the blank.

19. A method according to claim 1, wherein said ring presents a width measured in a radial direction that lies in the range of 1 to 2 times the thickness of said blank.

20. A method according to claim 8, wherein said arms are disposed uniformly all around the perimeter of said ring and wherein the number of arms lines in the range 6 to 12.

* * * * *